United States Patent [19]

Kokura et al.

[11] 4,436,982

[45] Mar. 13, 1984

[54] TWO ELECTRODE WELDING WITH DIFFERENT CURRENTS SUPPLIED TO THE ELECTRODES

[75] Inventors: Satoshi Kokura, Hitachiota; Masayasu Nihei, Hitachi; Hiroshi Wachi, Hitachi; Hiromi Mashida, Hitachi; Kousaku Senda, Hitachi, all of Japan

[73] Assignee: Hitachi, Ltd., Tokyo, Japan

[21] Appl. No.: 323,027

[22] Filed: Nov. 19, 1981

[30] Foreign Application Priority Data

Nov. 21, 1980 [JP] Japan ................................ 55-163347

[51] Int. Cl.³ ................................................ B23K 9/09
[52] U.S. Cl. ........................... 219/130.51; 219/137 PS
[58] Field of Search ....................... 219/137 PS, 130.51, 219/130.5

[56] References Cited

U.S. PATENT DOCUMENTS 3,549,857 12/1970 Needham et al. .............. 219/137 PS
3,627,974 12/1971 Normando et al. ............ 219/137 PS

FOREIGN PATENT DOCUMENTS 2039174 7/1980 United Kingdom ........... 219/130.51

Primary Examiner—C. C. Shaw
Attorney, Agent, or Firm—Antonelli, Terry & Wands

[57] ABSTRACT

In a two electrode welding method wherein welding is carried out by means of arcs struck between two electrodes and a parent metal, the two electrodes being located in side-by-side, spaced-apart relation in a direction in which the welding surface advances and movable relative to the parent metal, a portion of the parent metal is preheated by the arc struck between the leading electrode and the parent metal, and a preheated portion is melted by the heat of the arc struck between the trailing electrode and the parent metal when the former has moved to a position above the preheated portion of the latter to provide a deposited metal. The method has particular utility in applications where metal of high heat conductivity, such as copper, is welded.

15 Claims, 40 Drawing Figures

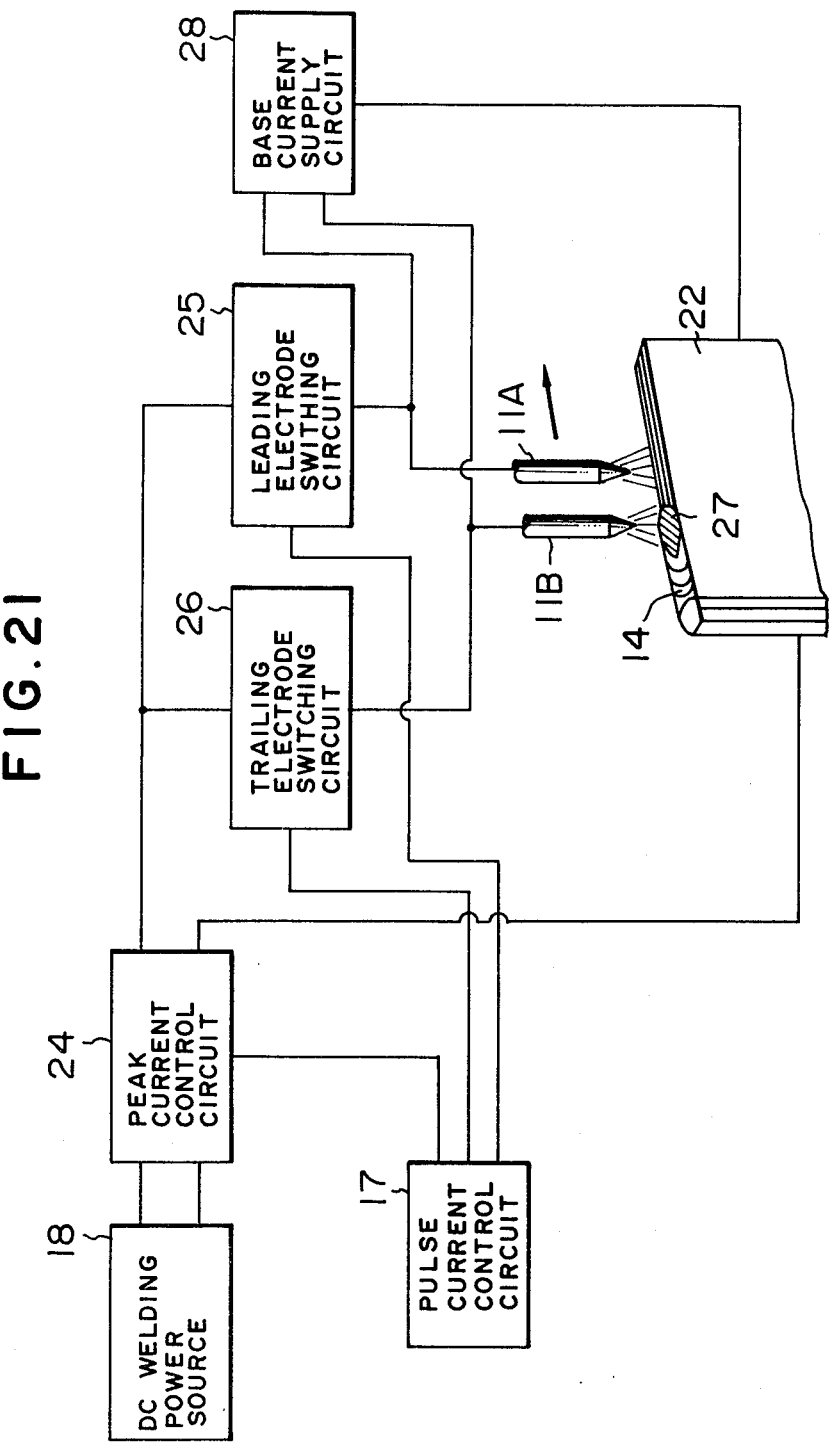

TWO ELECTRODE WELDING WITH DIFFERENT CURRENTS SUPPLIED TO THE ELECTRODES

BACKGROUND OF THE INVENTION

1. Field of the Invention

This invention relates to two electrode welding method, and more particularly it relates to a novel two electrode welding method suitable for use in welding copper as in joining a commutator bar of an electric motor to a coiled conductor.

2. Description of the Prior Art

Hitherto, a commutator bar and a coiled conductor of a rotary electric machine, such as a motor or generator, have been formed of copper or copper alloy material having good heat conductivity. When these parts are joined together, it has been usual practice to rely on brazing, plasma welding or TIG welding. In plasma welding, gas is ejected at high speed from a nozzle and sagging tends to occur. With members to be welded which are large in thickness and the weld length being small, brazing or one electrode TIG welding is preferable. However, in carrying out brazing and one electrode TIG welding, it is necessary that the members to be welded be heated to 200°–400° C. before welding is performed. In addition, there are the disadvantages in TIG welding that since it is impossible to perform continuous welding, it is necessary to take a long period of time for carrying out welding, and that since the members to be welded are heated in the entirety over a prolonged period of time, the weld zone shows a reduction in hardness, the grain becomes coarse, and blowholes are formed, thereby greatly reducing the quality of the product.

In order to carry out welding as desired, the use of a two electrode TIG welding process will be contemplated. The two electrode TIG welding method which is described in U.S. Ser. No. 99,848 (1979) that is a prior application of the present application and which is disclosed in U.S. Pat. No. 3,627,974 has two electrodes or a leading electrode and a trailing electrode from which arcs are generated for forming a molten metal pool by utilizing the heat of the arcs, to thereby form a deposited metal.

The two electrode TIG welding process as described hereinabove, however, might be disadvantageous depending on the shape and configuration of the weld zone. For example, when a commutator riser of an electric motor is welded to a coiled conductor, mica segments adjacent the riser would suffer overheating and burn and gas would be ejected as the riser and the coiled condutor are melted by the heat of the arc generated by the leading electrode. The gas would be incorporated into the shield gas, such as argon, ejected through a torch nozzle and make the arcs unstable. Moreover, the gas would be dissolved into the weld zone under the pressure of the arcs and mixed into the molten metal, thereby causing a multiplicity of blowholes to be formed in the deposited metal.

This phenonema has a delicate relation to the value of the welding current, the volume of the argon gas, the welding speed, and the shape of the torch nozzle. In a two electrode TIG welding process of the prior art, difficulties have been faced with in preventing the production of gas from combustion of mica segments and its incorporation in the deposited metal.

The presence of blowholes in the weld zone markedly reduces the mechanical strength of the weld zone and the region in its vicinity. Also, this reduces the cross-sectional area of the depositee metal, so that the commutator riser shows a rise in its resistance value and its temperature rises to a high level when a current is passed thereto.

To obtain complete joining of the riser and coiled conductor formed of copper or a copper alloy requires preheating to a temperature over 400° C. In view of the structure and performance of the commutator, however, the commutator bars shown a reduction in strength and hardness when heated to a temperature over 200° C., and the commutator as a whole undergoes deformation, so that the commutation function of the commutator is greatly impaired. Thus it has hitherto been difficult to subject the commutator and coiled conductor to preheating to a satisfactory degree at high temperature.

SUMMARY OF THE INVENTION

Object of the Invention

This invention has as its object the provision of a two electrode welding method capable of producing a weld zone free from blowholes.

STATEMENT OF THE INVENTION

An outstanding characteristic of the present invention is that in carrying out two electrode arc welding, the parent metal is subjected to preheating without melting of the same by means of a leading electrode to remove gas from the parent metal and its vicinity and then the parent metal is melted by means of a trailing electrode.

The invention has particular utility in welding copper, in particular, by rendering the two electrodes nonconsumable electrodes.

Another outstanding characteristic of the invention is that two tungsten electrodes are used and pulse currents of different phases are supplied to the electrodes. Preferably, degreasing of the surface of the parent metal or degassing and preheating thereof in case where there is any gas generating source in the vicinity of the weld zone is carried out by the arc of the leading electrode and the preheated portion is melted by the trailing electrode, particularly by lowering the arc pressure with a mean current of lower value than that of the leading electrode. The invention is characterized in that a pulse-like welding current is supplied alternately to the leading electrode and the trailing electrode.

In this case, preferably the time distribution rate of the peak current of the leading electrode is selected to below 50% and the time distribution rate of the peak current of the trailing electrode is selected to above 50% while the peak current of the leading electrode is higher in value than the peak current of the trailing electrode.

Preferably the arc pressure of the trailing electrode is made lower than that of the leading electrode and the mean current of the trailing electrode is selected to below 50% of that of the leading electrode.

Another outstanding characteristic of the invention is that a portion of the parent metal is preheated without being melted by the leading electrode and then the parent metal is melted in the form of spots by the trailing electrode when the latter has moved the above the preheated portion of the parent metal.

In this case, it is preferable that a pulse-like current is supplied to each of the leading and trailing electrodes, and that a peak current is supplied to the trailing electrode while a base current is supplied to the leading electrode. The peak current supplied to the trailing electrode is preferably equal to or higher in value, when passed to the parent metal, than the peak current supplied to the leading electrode to melt the parent metal, and the peak current supplied to the trailing electrode in other positions than the weld zone is preferably below 30% of the peak current supplied thereto in the weld zone.

A further outstanding characteristic of the invention is that portions of the riser of the commutator and the coiled conductor of a rotary electric machine to be joined by welding are preheated without being melted, and after degassing of the mica segments adjacent the portions to be welded is effected, the portions to be welded are melted by the trailing electrode, to thereby unite the riser to the coiled conductor.

Preferably the riser and the conductor are formed of copper and arc welding is carried out by using two electrodes both of which being nonconsumable electrodes, particularly by spot welding.

BRIEF DESCRIPTION OF THE DRAWINGS

FIG. 21 is a block diagram of another form of two electrode welding machine suitable for carrying the welding method according to the invention into practice;

DETAILED DESCRIPTION OF THE PREFERRED EMBODIMENTS

EXAMPLE 1

Figure 1:
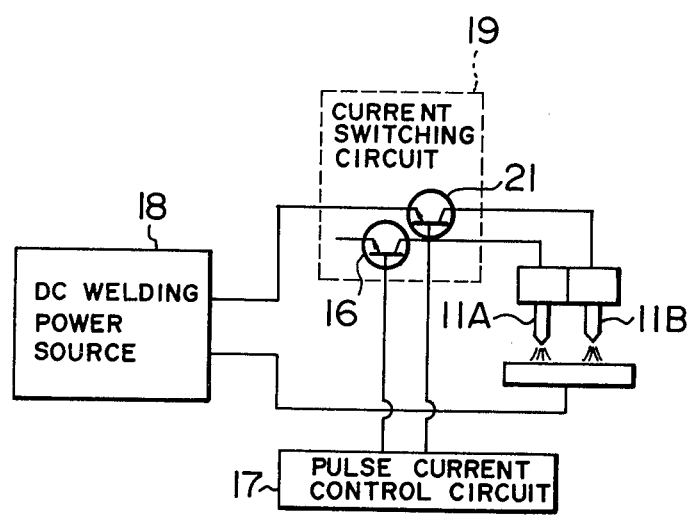
FIG. 1 is a block diagram of a two electrode welding machine suitable for carrying the welding method according to the invention into practice.
Figure 2A:
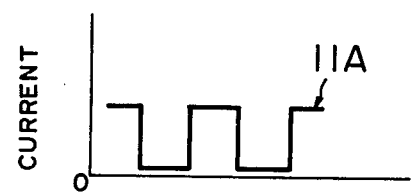
FIGS. 2a, 2b are diagrammatic representations of the wave forms of currents showing the phases of the two electrodes used in the welding method according to the invention.
Figure 2B:
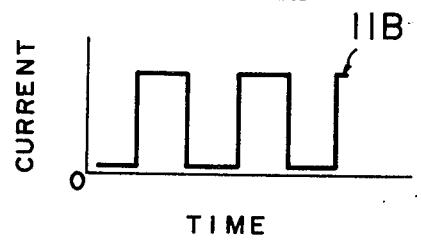
Figure 3:
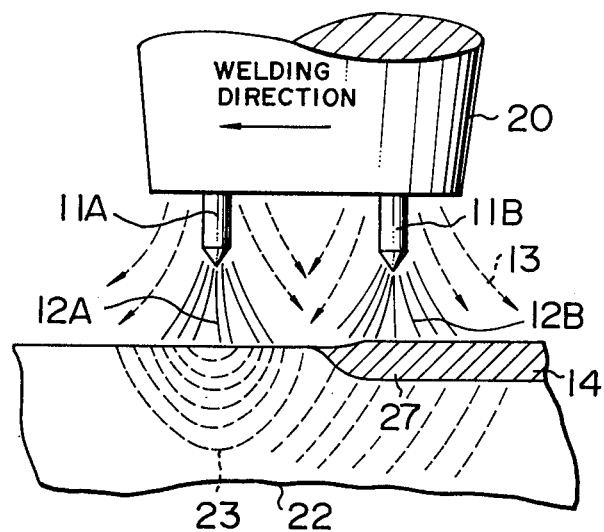
FIG. 3 is a vertical sectional view for explaining the principle of the welding method according to the invention.

A welding machine used in the present invention and the principles thereof are shown in FIGS. 1–3. Referring to FIG. 1, the welding machine comprises a DC welding power source 18, two electrodes 11A and 11B, transistors 21 and 16 forming a current switching circuit 19, and a pulse surrent control circuit 17.

In operation, the pulse current control circuit 17 transforms a DC current into a pulse current which is supplied alternately to the electrodes 11A and 11B with a time lag by one wave form so that the two wave forms may not be applied to the electrodes 11A and 11B simultaneously, by the action of the current switching circuit 19, as shown in FIG. 2.

By controlling the pulse current in this way, the arcs generated by the electrodes 11A and 11B are sustained at all times without extinction. Since currents are supplied to the electrodes 11A and 11B with a time lag, the struck arcs are such that there is no magnetic interference, such as attraction and repulsion, between them.

Referring to FIG. 3, the electrodes 11A and 11B are arranged in the direction in which welding is carried out. An arc 12A is struck between the leading electrode 11A and a parent metal 22 to generate heat by which the surface of the parent metal 22 is degreased and degassed while being preheated as indicated at 23. In material of good heat conductivity such as copper, the preheating aids in melting the parent metal by the trailing electrode 11B. Then the trailing electrode 11B moving with a torch nozzle 20 as a unit is shifted to a position above a preheating section where an arc 12B is struck between the trailing electrode 11B and the parent metal 22, to melt the parent metal 22 as indicated at 27 to form a deposited zone 14. The preheating by the leading electrode 11A and the melting by the trailing electrode 11B are carried out continuously. However, the electrode 11A and 11B and the torch nozzle 20 are fixed and the parent metal 22 may be moved.

To avoid mutual interference between the arcs 12A and 12B struck between the leading electrode 11A and trailing electrode 11B and the parent metal 22, to prevent inflow of combustion gas into the shield gas, and to increase the effect of preheating the parent metal 22, it is desirable that the distance between the electrodes 11A and 11B be in the range between 5 and 15 mm.

Figure 4:
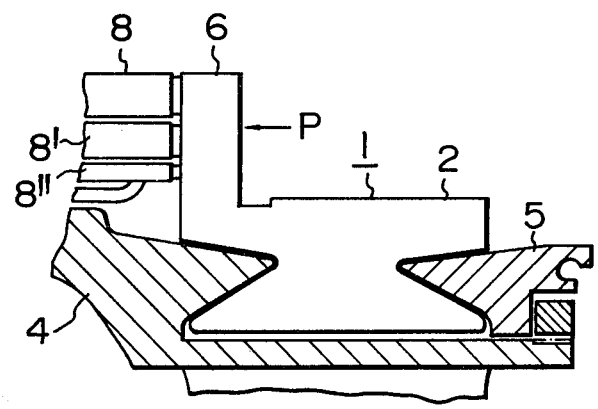
FIG. 4 is a fragmentary vertical sectional view of the commutator of an electric motor in which the welding method according to the invention can have application.
Figure 5:
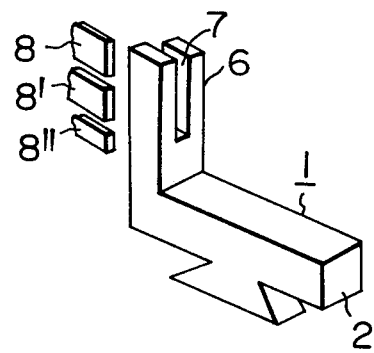
FIG. 5 is a perspective view showing the commutator and the coiled conductor in relation to each other.
Figure 6:
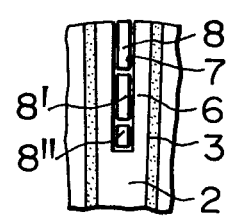
FIG. 6 is a view as seen in the direction of an arrow P in FIG. 4.

A welding method according to the invention as applied to the welding of the commutator of a rotary electric machine will be described. An electric rotary machine, such as an electric motor for a vehicle, comprises a commutator 1 as shown in FIGS. 4–6. As shown, commutator bars 2 and mica segments 3 are arranged alternately to the commutator 1 and clamped together at opposite ends by a clamp ring 4 and a V-ring 5. The commutator bar 2 includes a riser 6 formed with a groove 7 in which coiled conductors 8, 8' and 8" extending from the motor coil are inserted and connected. FIG. 6 shows a portion of FIG. 4 as viewed in the direction of an arrow P.

Figure 7:
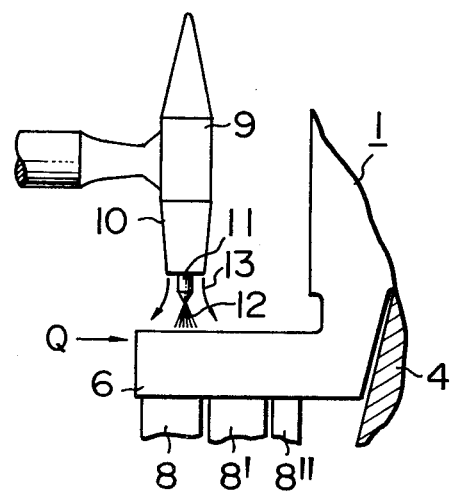
FIG. 7 is a side view showing the manner of welding effected by one electrode welding method of the prior art.
Figure 8:
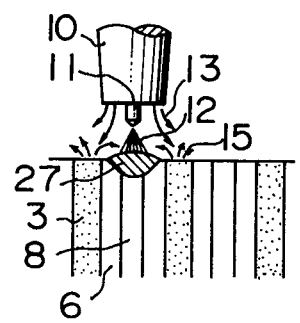
FIG. 8 is a view as seen in the direction of an arrow Q in FIG. 7.

When connecting the riser 6 and the coiled conductor 8 to each other, it has hitherto been customary to use one electrode TIG welding method as shown in FIGS. 7 and 8 in which a torch is arranged in a position in which welding is to be carried out and an arc 12 is struck between a tungsten electrode 11 projecting from a nozzle 10 to prevent oxidation of the tungsten electrode 11 and to stabilize the arc 12, when welding is carried out. In this welding, the riser 6 is heated to a high temperature by the arc 12 and melted to produce a molten metal 27 which joins the riser 6 to the coiled conductor 8 into a unitary structure.

Some disadvantages are associated with such one electrode TIG welding method described hereinabove. That is, the mica segments 3 in the vicinity of the weld zone might be burnt by the heat of the arc 12 and a gas 15 might be produced, which might be incorporated in the shield gas 13 and cause the latter to flow in turbulence. The turbulent flow of the mixture of gas 15 and shield gas 13 might be diffused into a molten pool 27 and entrained in weld bead, thereby causing blowholes to be produced in the weld zone. The presence of a large number of blowholes in the weld bead would cause a reduction in the mechanical strength of the weld zone. Particularly the strength of the weld zone to cope with thermal stress during passing of a current, centrifugal forces during rotation and vibration of wheels and rails is markedly reduced. Also, the blowholes increases the electrical resistance of the weld zone, causing a local increase in temperature to occur. Since a current flows in condition of excessive density through the weld zone, an increase in electrical resistance raises a serious problem and might cause the temperature of the rotor as a whole to increase.

Figure 9:
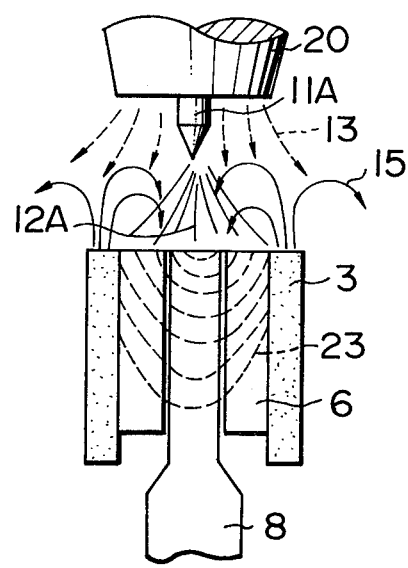
FIGS. 9 and 10 are sectional views for explaining the principle of welding carried out by means of a leading electrode and a trailing electrode as applied to the joining of the commutator by welding shown in FIG. 4.
Figure 10:
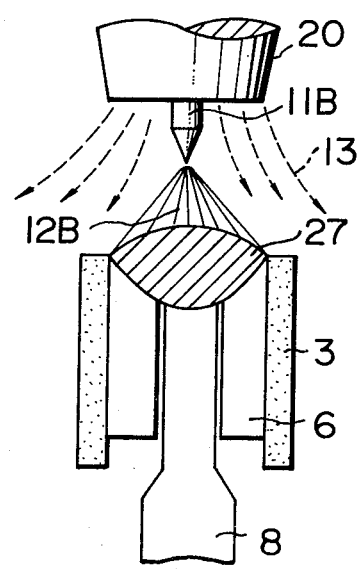

FIGS. 9 and 10 are views in explanation of the welding method according to the invention as applied to the welding of the riser of a commutator of a rotary electric machine. In FIGS. 9 and 10, 8 is a coiled conductor, 6 a commutator riser and 3 an insulating mica segment. The arc 12A is struck between the leading electrode 11A and the parent metal to produce heat by which the parent metal is locally heated to an elevated temperature (400° C., for example). The gas 15 generated by the mica segment 3 is removed as indicated by arrows in the figures. Then the parent metal or the torch nozzle 20 is moved to allow the parent metal to be melted by the arc 12B struck between the trailing electrode 11B and the parent metal, to melt the latter. As the parent metal is melted, the coiled conductor 8 is joined by welding to the commutator riser 6 to provide a unitary structure. Reference numeral 13 designates a shield gas.

The weld zone produced in this way is sound and free from defects and has no blowholes in its cross section.

In this embodiment of the invention, it is possible to produce a weld zone free from blowholes. Thus, the weld zone has increased mechanical strength and low electrical resistance, and the temperature is prevented from rising to a high level when a current is passed. Further, since preheating and welding are carried out simultaneously, welding speed is increased by 1.5 times as compared with a welding method of the prior art in which preheating and welding are performed separately. Moreover, since with one welding electric source it is possible to supply electric current to the two electrodes, it becomes possible to reduce installation cost.

In the invention, when the two electrodes arranged in the torch nozzle in spaced-apart relation are moved in the direction of welding, there might be generated some portions in which the parent metal is not subjected to both operations of preheating and melting when the movement of the torch nozzle is initiated and its movement is interrupted, depending on the shape of the parent metal and the position in which it is located. FIGS. 11–15 show a method which enables preheating as well as welding to be carried out on these portions of parent metal.

Figure 11:
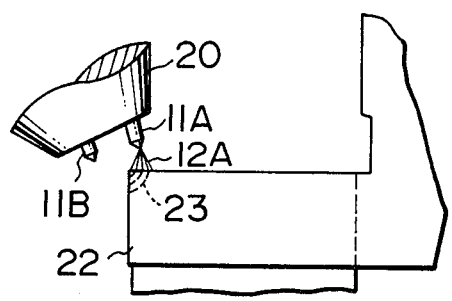
FIGS. 11–15 are sectional views showing the manner of joining a corner portion as the welding method according to the invention is applied to the joining of the commutator shown in FIG. 4.
Figure 12:
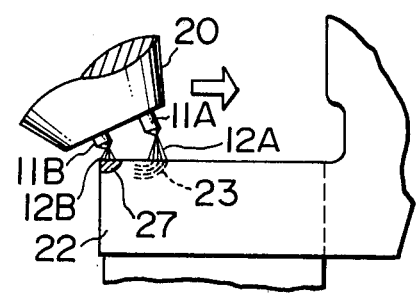
Figure 16:
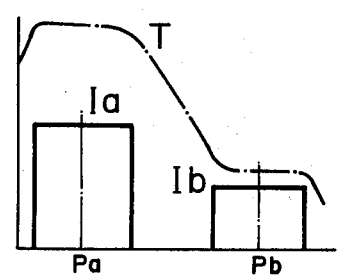
FIGS. 16–18 are views for explaining the welding conditions in FIGS. 13–15.
Figure 17:
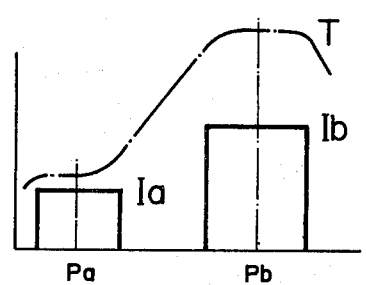
Figure 18:
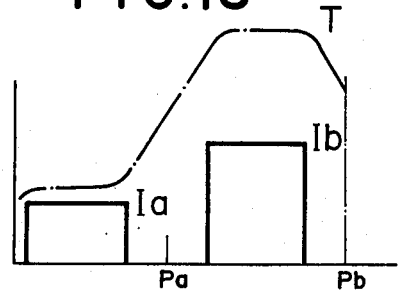

First, the arc 12 is generated when the leading electrode 11A is disposed above one end portion of the parent metal 22 composed of the commutator riser and coiled conductor, and the movement of the torch nozzle 20 is initiated (FIG. 11). As the torch nozzle 20 moves, the arc 12B is generated when the trailing electrode 11B is disposed above the one end portion of the parent metal 22 (FIG. 12). FIG. 16 shows the values of currents passed to the two electrodes and the temperatures of portions of the parent metal below the two electrodes. In FIGS. 16–18, Pa, and Pb indicate the positions of the parent metal below the leading electrode and the trailing electrode respectively, Ia and Ib indicate the current values of the leading electrode and the trailing electrode respectively, and T is the temperature of the parent metal.

Figure 13:
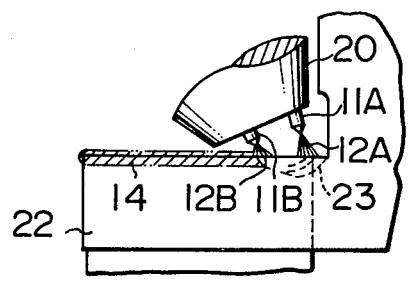
Figure 14:
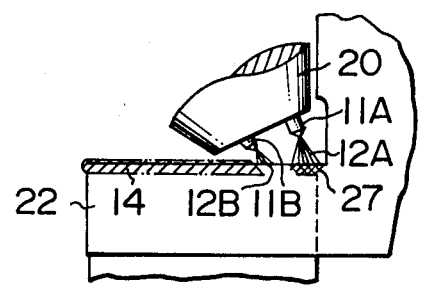
Figure 15:
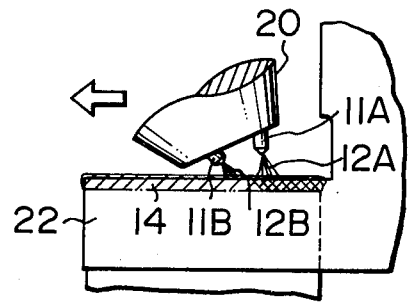

As the torch nozzle 20 moves, the leading electrode 11A preheats the parent metal 22 and the trailing electrode 11B melts the same in a welding operation, before the torch nozzle 20 stops in a predetermined position (FIG. 13). In this predetermined position, the current values for the leading electrode 11A and the trailing electrode 11B are switched over (FIG. 14). FIG. 17 shows the values of the currents passed to the two electrodes and the temperature of the parent metal after the switching-over of the current values has been effected. Following the switching-over of the current values, the torch nozzle 20 is moved in a direction opposite the direction of welding, to preheat the parent metal 22 by the electrode 11B and weld the same by the electrode 11A. By the operation shown in FIG. 15, the unmelted portions between the two electrodes can be melted and welded. FIG. 18 shows the temperature of the parent metal when welding is effected by moving the torch nozzle 20 in the reverse direction and the temperatures of the parent metal below the two electrodes. As shown in FIGS. 14 and 17, the torch nozzle 20 may be rotated through 180 degrees without altering the welding conditions of the two electrodes, when the direction of movement of the torch nozzle 20 is changed. By using the welding method shown in FIGS. 11-15, since it is possible to eliminate those portions of the parent metal which are left unmelted when welding is initiated and terminated, this welding method has a particular utility in applications where the shape of the parent metal or the position in which it is located tends to cause unmelted portion to be produced in the parent metal.

In this embodiment, a current from a single DC power source is changed into a pulse current by a pulse current control device which is applied to the two electrodes. Alternatively two DC power sources may be provided to supply a DC power to the two electrodes. Further, in this embodiment, although no filler metal is described as being used, the invention includes the use of a filler metal. When a filler metal is used, the filler metal is preferably located in the vicinity of the trailing electrode and in a position opposite the leading electrode.

According to the invention shown and described hereinabove, the parent metal is preheated by the heat of the arc struck between the leading electrode and the parent metal without melting the same, to remove gas on the surface of the parent metal or combustible gas in its vicinity, and then the parent metal is melted by the heat of the arc struck between the trailing electrode and the parent metal. This enables a blowhole-free weld zone to be obtained.

EXAMPLE 2

Figure 19A:
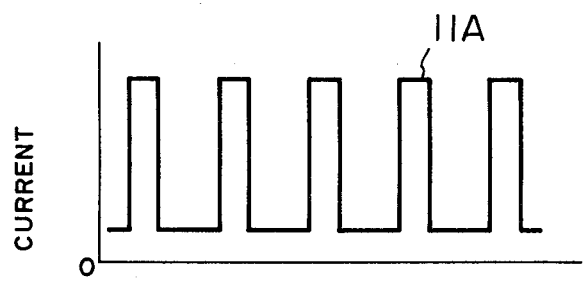
FIGS. 19a, 19b are diagrammatic representations of the wave forms of currents of the leading electrode and the trailing elctrode used in the welding method according to the invention.
Figure 19B:
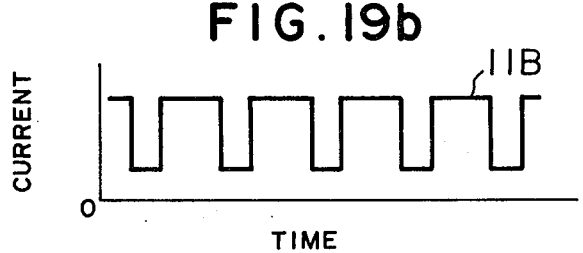

FIG. 19 shows another method for decreasing interference between the arcs generated between the leading electrode 11A and the trailing electrode 11B and the parent metal. In this method, a peak current of below 50% of current distribution time rate is periodically supplied to the leading electrode 11A in superposed relation to a base current, and a peak current is supplied to the trailing electrode 11B when the base current is supplied to the leading electrode 11A. In this case, by setting the peak current supplied to the trailing electrode 11B to be over 50% of the time distribution rate, it is possible to set the peak current supplied to the trailing electrode 11B at a lower value than the peak current supplied to the leading electrode 11A, thereby enabling the arc pressure of the trailing electrode 11B to be decreased.

Figure 20:
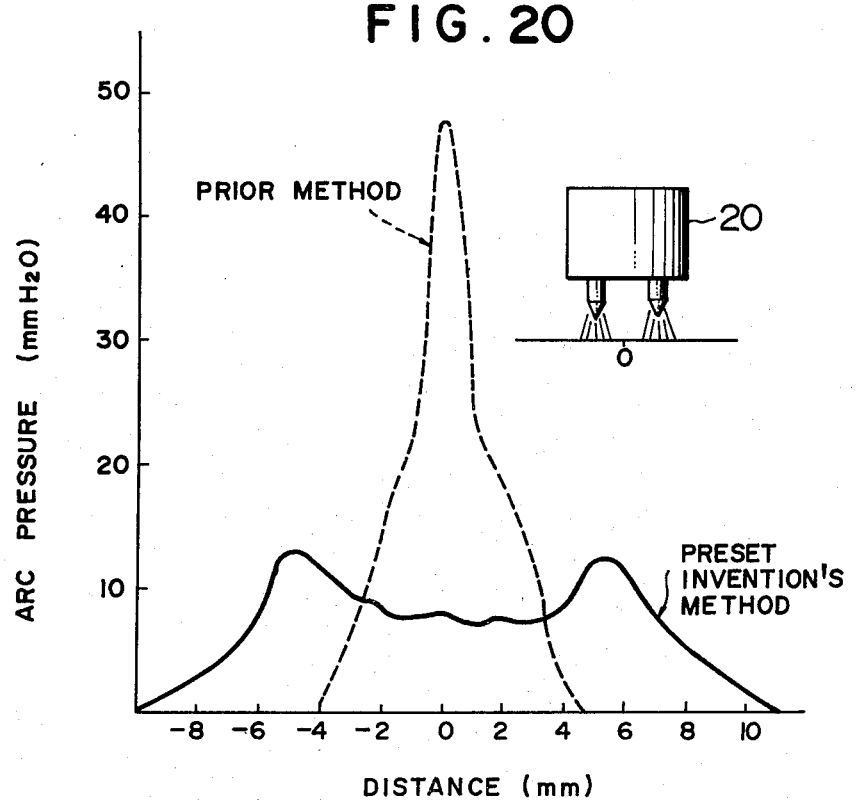
FIG. 20 is a view showing arc pressures in the welding method according to the invention using two electrodes and in the welding method of the prior art using one electrode.

FIG. 20 shows a comparison of the arc pressure obtained in the two electrode welding method according to the invention with the arc pressure obtained in the one electrode TIG welding method of the prior art. When a current of constant value of 200 A was supplied to the electrode with the parent metal and the electrode being spaced apart by a distance of 3 mm, the arc pressure in the method of the prior art was 48 mmH$_2$O at a maximum as indicated by a broken line. On the other hand, in the method accordng to the invention, the arc pressure obtained in the two electrode welding method according to the invention was about 13 mmH$_2$O when a current of 100 A was distributed to each electrode with the spacing between the two electrodes being 10 mm. It will be seen that the arc pressure in the method according to the invention is about ¼ that in the method of the prior art.

FIG. 21 is a block diagram showing an example of the apparatus for carrying the method according to the invention into practice. The apparatus comprises a peak current control circuit 24 for controlling the peak current supplied to each of the electrodes 11A and 11B after being supplied from a DC welding power source 18, and a leading electrode switching circuit 25 and a trailing electrode switching circuit 26 for switching over the peak current. Control is effected by means of the pulse current control circuit 17. A base current is supplied to each of the electrodes 11A and 11B by a base current supply circuit 28 to strike an arc between each electrode and the parent metal when the pulses are switched over.

Figure 22A:
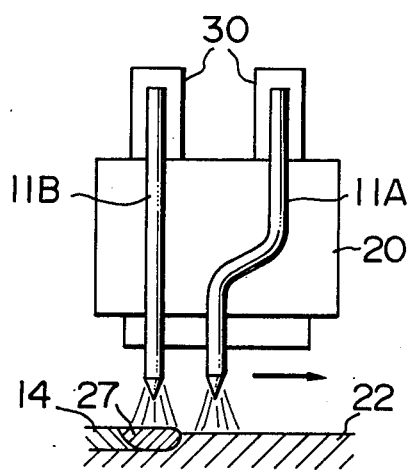
FIGS. 22a, 22b, 22c are views showing another form of two electrodes used in the welding method according to the invention.
Figure 22B:
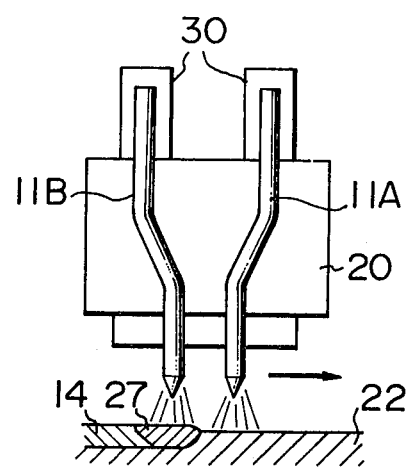
Figure 22C:
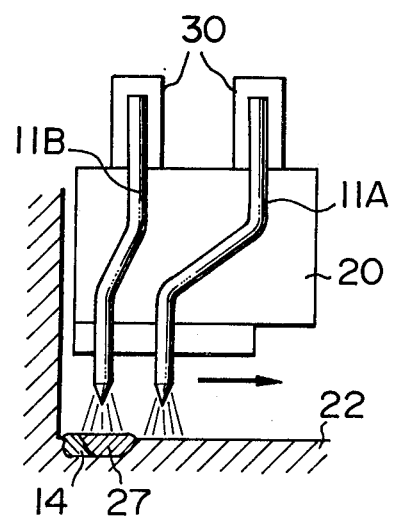

FIGS. 22a, 22b and 22c show examples of the shape of the tungsten electrodes suitable for carrying the welding method according to the invention into practice. In order to bring the forward ends of the two electrodes to a parallel, closely-disposed relation, one or both of the electrodes 11A and 11B are bent so as to be parallel to an electrode fixing jig 30. By this arrangement, no change occurs in the spacing between the electrodes even if the forward ends of the electrodes are consumed, and the electrodes can be readily fixed in place by means of the electrode fixing jig 30.

By using the electrodes of this shape, the method of the invention can have particular utility in carrying out welding of an edge joint. The use of the aforesaid electrodes has the effect of carrying out welding successfully in applications where melt down tends to be caused to occur by the arc pressure during welding due to the difficulty of mounting a backing strip for performing butt welding of thin sheets.

In the embodiment shown and described hereinabove, the surface of the parent metal is degreased and degassed by the arc of the leading electrode, and the parent metal is then melted by the arc of the trailing electrode. By virtue of this feature, the invention is able to eliminate formation of blowholes in the weld metal and to carry out welding stably by avoiding sagging of an edge joint, because the preheating carried out by the leading electrode enables the arc pressure of the trailing electrode to be reduced.

EXAMPLE 3

Figure 23:
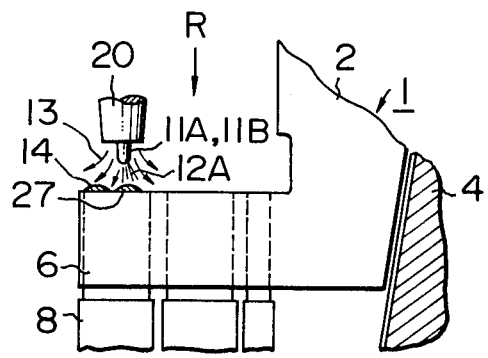
FIG. 23 is a view showing the joining of the commutator of a rotary electric machine in spot form by the welding method according to the invention.
Figure 24:
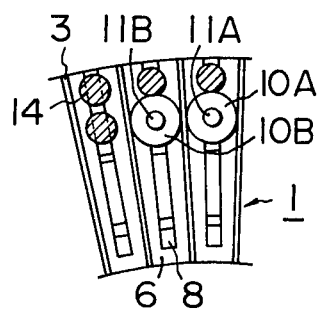
FIG. 24 is a view as seen in the direction of an arrow R in FIG. 23.
Figure 25A:
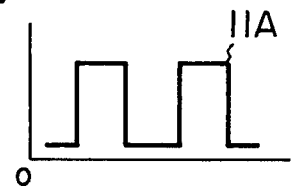
FIGS. 25a and 25b are diagrams showing the wave forms of the currents passed to the two electrodes.
Figure 25B:
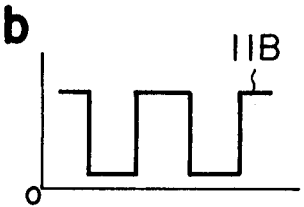

FIGS. 23-27 show the two electrode welding method according to the invention as applied to the spot welding of the commutator of a rotary electric machine. Referring to FIGS. 23 and 24, the tungsten electrodes 11A and 11B protruding out of the torch 20 are arranged over the risers 6 disposed adjacent one another, and portions of the riser 6 and coiled conductor 8 to be welded are heated by the arc 12A of the leading electrode 11A so as to thereby effect degassing of the mica segments 3 adjacent thereto as well as to effect preheating of the portions to be welded. Then the portions to be welded that have been preheated while degassing of the mica segments 3 have been performed by the arc 12A of the leading electrode 11A are heated by the arc 12B of the trailing electrode 11B, to thereby melt the riser 6 and form a spot-like deposited zone 14 so as to thereby join the riser 6 to the coiled conductor 8. The degassing and preheating by the leading electrode 11A and the spot welding by the trailing electrode 11B are successively carried out by moving the commutator 1 by one pitch of the riser 6. Upon completion of welding for one complete circle of the commutator 1, the torch 20 is moved radially by a predetermined distance and then moved circumferentially for carrying out welding for another complete circle of the commutator 1. This process is repeated for all the portions to be welded in the radial direction. Stated differently, welding is carried out in such a manner that for one portion to be welded, degassing and preheating of the mica segments 3 is carried out by the leading electrode 11A and then the riser 6 that has been degassed and preheated is moved by one pitch to a position in which it is located facing the trailing electrode 11B, so as to enable welding of the riser 6 to the coiled conductor 8 to be carried out.

When degassing and preheating of the mica segments is carried out by the leading electrode 11A and welding of the reser 6 to the coiled conductor 8 is carried out by the trailing electrode 11B as described hereinabove, mutual interference would occur between the arcs generated by the two electrodes 11A and 11B if the arcs were generated simultaneously. To avoid this trouble, currents $I_A$ and $I_B$ shown in FIGS. 25a, 25b and 26 which are offset by one-half wave are preferably passed to the two electrodes 11A and 11B in order that the arc is not generated at one electrode when the arc is generated at the other electrode.

Figure 26:
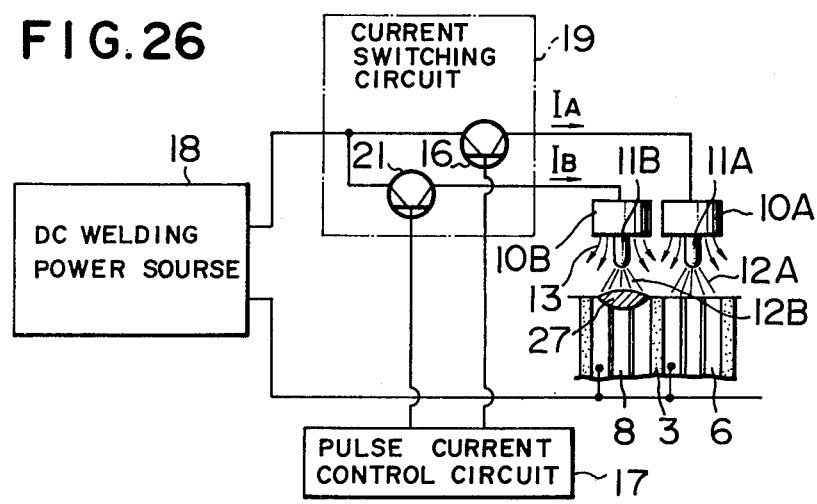
FIG. 26 is a block diagram of one example of the welding machine for carrying out spot welding by the welding method according to the invention.

FIG. 26 shows an example of the welding machine in which the currents $I_A$ and $I_B$ offset by one-half wave from each other arc passed to the two electrodes 11A and 11B. The welding machine comprises a welding power source 18, a pulse current control circuit 17, and a current switching circuit including two transistors 16 and 21 subjected to on-off control alternately upon receiving signals from the pulse current control circuit 17.

Figure 27:
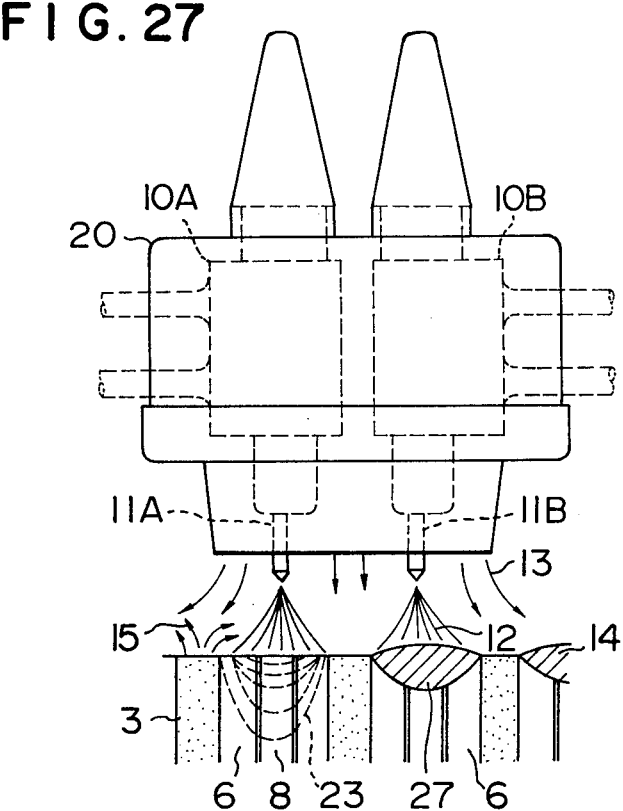
FIG. 27 is a view, on an enlarged scale, showing a concrete example of the two electrode spot TIG welding torch used in carrying out spot welding by the welding method according to the invention.

As shown in FIG. 27, the torch 20 is constructed in such a manner that the two electrodes 11A and 11B can be located immediately above the risers 6 disposed adjacent each other. The torch 20 includes a nozzle portion which is preferably formed of copper, iron or stainless steel because it is exposed to the arcs and heated to a high temperature, and which preferably has a cooling water pipe, for example, attached to its surface so as to allow the nozzle to be used while being cooled by water. The spacing between the risers 6 and the two electrodes 11A and 11B preferably has a value smaller than the spacing between the two electrodes 11A and 11B, to achieve striking of suitable arcs.

In the embodiment shown and described hereinabove, it is possible to produce a sound, blowhole-free weld because degassing of the mica segments 3 is carried out beforehand by the leading electrode 11A and production of combustion gas from the mica segments 3 can be prevented when the riser 6 is welded to the coiled conductor 8 later on, thereby enabling formation of blowholes due to the combustion gas 15 to be avoided. The result of this is that the weld zone between the riser 6 and the coiled conductor 8 can have its mechanical strength markedly increased and the electrical resistance greatly reduced. Thus it is possible to avoid a rise in the temperature of the rotor by preventing a rise in the temperature of the joint between the riser 6 and coiled conductor 8. Also, since it is possible to carry out preheating at elevated temperature by the arc of the leading electrode 11A, the welding speed can be increased and softening and thermal deformation of the commutator bars can be prevented, thereby increasing operation efficiency.

EXAMPLE 4

Figure 28A:
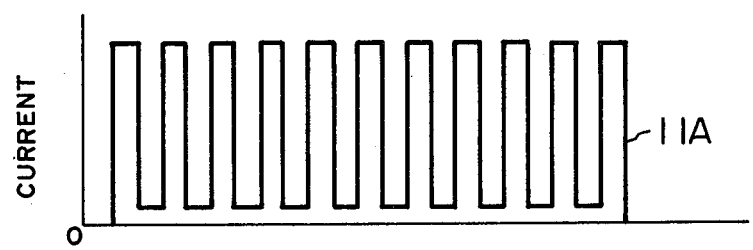
FIGS. 28a, 28b are views showing the wave forms of currents supplied to the leading electrode and the trailing electrode used in carrying out spot welding by the two electrode TIG welding method according to the invention.
Figure 28B:
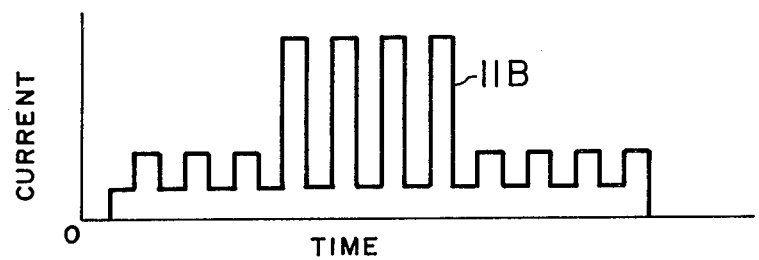
Figure 29:
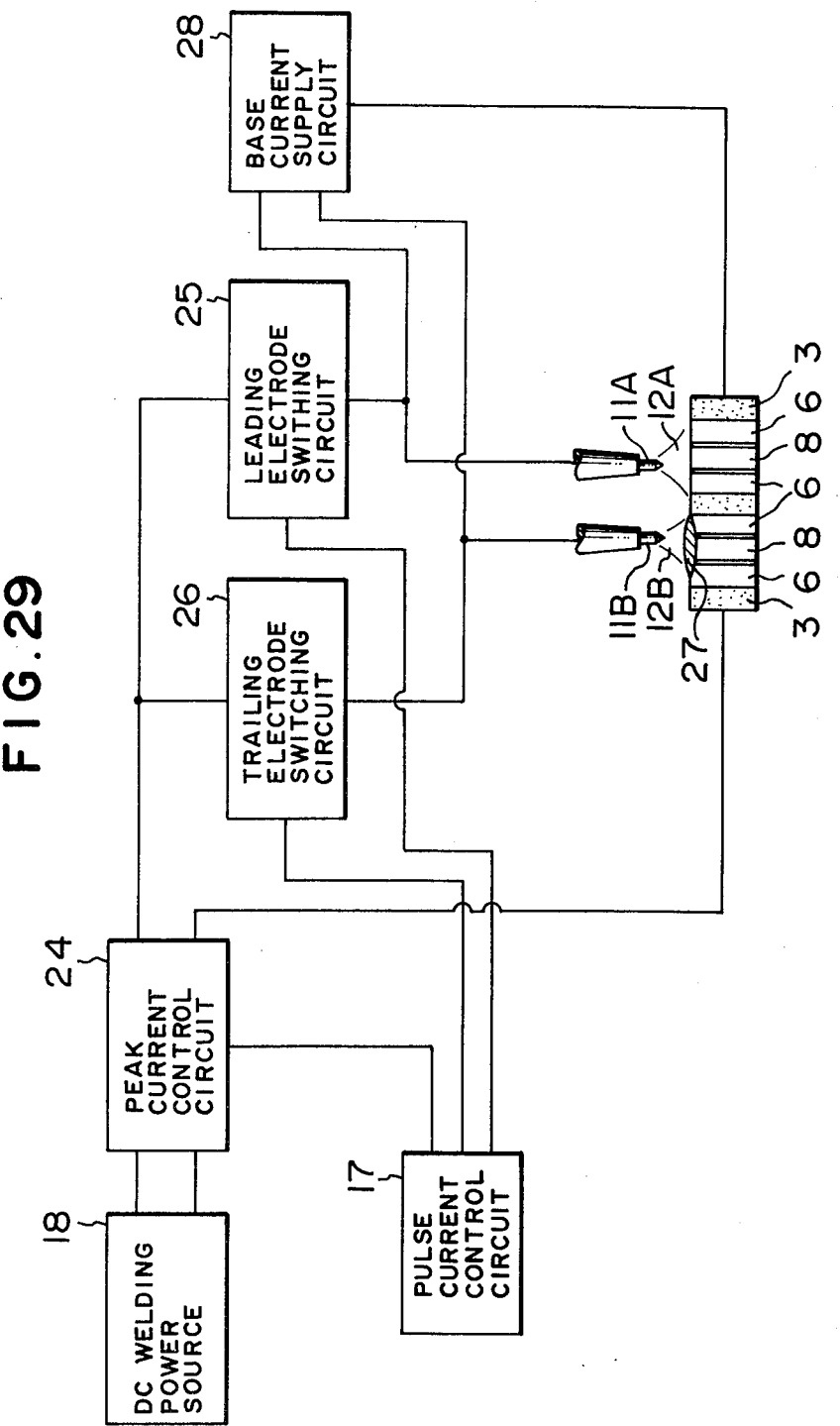
FIGS. 29 and 30 are block diagrams of welding machines suitable for carrying out spot welding by the method according to the invention.
Figure 30:
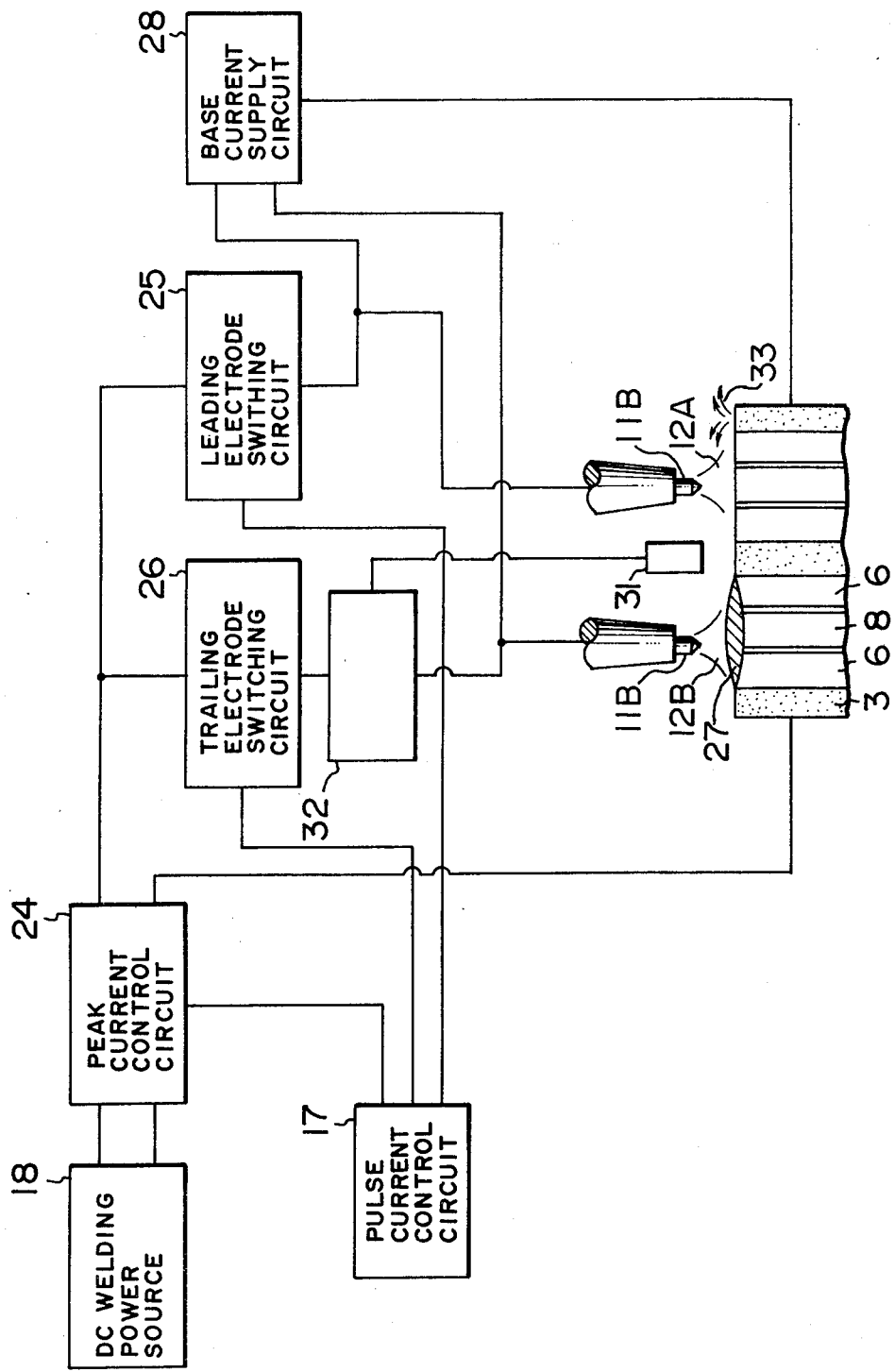

FIG. 28 shows the wave forms of the currents passed to the leading electrode and the trailing electrode used for carrying out spot welding by the two electrode welding method according to the invention, and FIGS. 29 and 30 are block diagrams showing apparatus for carrying out spot welding by the two electrode welding method according to the invention.

In the embodiment, the commutator of a rotary electric machine including commutator risers 6 and coiled conductors 8 serving as a parent metal shown in FIG. 8 is subjected to spot welding by the two electrode method according to the invention. The leading electrode 11A generates an arc 12A for preheating the members 6 and 8 to be welded while carrying out degassing of the mica segments 3 and degreasing and degassing of the surfaces of the members 6 and 8 to be welded. The preheating has the effect of improving penetration of the weld zone by the trailing electrode 11B when the members to be welded are formed of copper of good heat conductivity. The arc 12A is formed also on the surfaces of the insulators or mica segments 3 to cause gas generated by the mica segments 3 to escape before the members 6 and 8 to be welded are melted. Thereafter a weld metal 14 is formed by the trailing electrode 11B. In this case, mutual interference of the arcs would occur if the spacing between the two electrodes were small. FIG. 28 shows the wave forms of the welding currents passed to the leading electrode 11A and the trailing electrode 11B intended to avoid mutual interference of the arcs. A peak current is periodically supplied to the leading electrode 11A in superposed relation to a base current, and a peak current is supplied to the trailing electrode 11B when the base current is supplied to the leading electrode 11A. The peak current supplied to the trailing electrode 11B when it is located above the members 6 and 8 to be welded is distinct from the peak current supplied thereto when it is located above the mica segment 3. When the trailing electrode 11B is located above the members 6 and 8 to be welded, the peak current supplied thereto has a value equal to or slightly greater than that of the leading electrode 11A, to thereby melt the members 6 and 8 to be welded and form the weld metal 14. The peak current is controlled such that the peak current supplied to the trailing electrode 11B when it is disposed above the mica segment 3 is below 30% of the peak current supplied thereto when it is disposed above the members 6 and 8 to be welded, to thereby prevent production of noxious gas from the mica segments 3 and avoid formation of blowholes. Also, by controlling the peak current supplied to the leading electrode 11A and the peak current supplied to the trailing electrode 11B, it is possible to reduce the arc pressure applied by the trailing electrode 11B when the latter is disposed above the mica segment 3 to thereby enable a sound weld to be produced.

FIG. 29 shows in a block diagram an example of the apparatus for carrying out welding as described hereinabove. A DC power supplied from the DC power source 18 is controlled by the peak current control circuit 24 and changed into a peak current supplied to the leading electrode 11A and the trailing electrode 11B by switching over the current by the leading electrode switching circuit 25 and the trailing electrode switching circuit 26 between different values. The aforesaid control operations are performed by the pulse current control circuit 17. A base current is supplied by the base current supply circuit 28 to the electrodes 11A and 11B, to sustain the arcs when the pulse current is switched over between different values.

Figure 31:
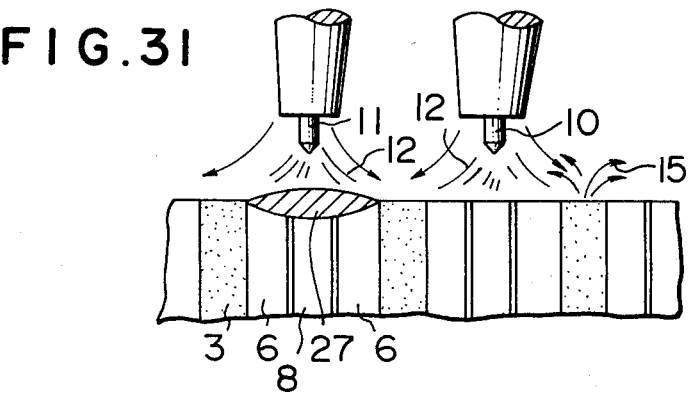
FIG. 31 is a view showing the generation of a gas from an insulator when the commutator bar of a rotary electric machine is welded to the coiled conductor by the two electrode TIG welding method according to the invention.

FIG. 30 shows a modification of the apparatus shown in FIG. 29, in which the trailing electrode 11B is provided with a position sensor 31. As a peak current of the same value is supplied to the trailing electrode 11B when the latter is located above the members 6 and 8 to be welded and the mica segment 3, a gas 33 having harmful effects on the welding might be generated by the mica segment 3 as shown in FIG. 31 with an arrow 15. To avoid this trouble, a position sensor 31 mounted on the trailing electrode 11B senses the positions of the members 6 and 8 to be welded and the mica segment 3 and controls a welding control circuit 32 so as to allow an arc to be generated only when the trailing electrode 11B is located above the members 6 and 8 to be welded.

Figure 32:
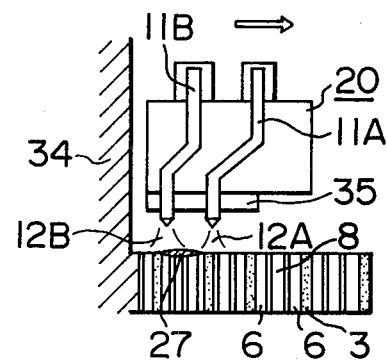
FIG. 32 is a view showing another form of the welding process for welding a narrow portion.
Figure 33A:
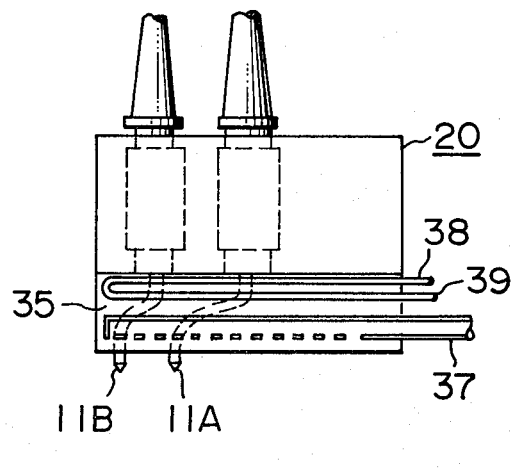
FIGS. 33a and 33b are a front view and a side view respectively of an embodiment in which pipe for supplying subsidary shield gas is mounted outside or around the nozzle.
Figure 33B:
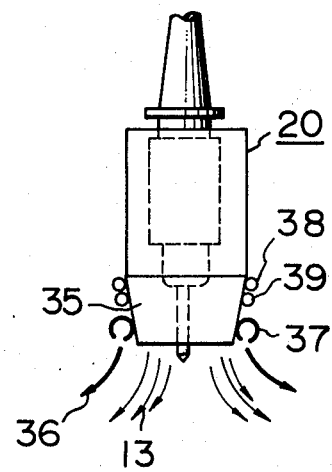

FIG. 32 is a view showing the two electrode TIG welding method according to the invention as applied to the welding of the members to be welded that have a wall 34. In a position close to the wall 34, shielding of the trailing electrode 11B is not satisfactorily effected, and the electrode is oxidized and consumed greatly and blow-holes tend to be formed in the weld zone. To avoid this trouble, a welding nozzle 35 is provided as shown in FIGS. 33a and 33b for supplying a shield gas 13, and a pipe 37 is mounted outside or around the welding nozzle 35 for supplying a subsidiary shield gas 36. Thus when welding is carried out, the shield gas 13 and subsidiary sheild gas 36 are supplied to prevent oxidation of the electrodes and formation of blowholes. 38 is a welding torch cooling water inlet, and 39 a welding torch cooling water outlet.

A comparison of the welding carried out according to the invention with the welding of the prior art is shwon in Table 1.

TABLE 1

| Winding Method | | External View of Bead | Presence or Absence of Blowholes | Pre-heating |
|---|---|---|---|---|
| One Electrode TIC Welding | | Poor | Plenty | 400° C. |
| Two Electrode TIG Welding | No Switching | Fair | Some | None |
| | With Switching and Single Shield | Good | Little | None |
| | With Switching and Double Shield | Good | None | None |

Microscopic observations of the weld zone in cross section have shown that the weld zone is replete with blowholes when produced by a one electrode TIG welding method of the prior art. However, in the weld zone produced by the two electrode TIG welding method according to the invention no blowhole formation was found. The invention offers the advantages not only that no preheating is required but also that the bead is good in external appearance and no blowholes are formed in the weld zone.

Table 2 shows the results of welding achieved by varying the welding conditions when the welding method according to the invention is carried into practice.

TABLE 2

| Specimen | Welding Speed (mm/min) | Total Welding Current (A) | Current Ratio of Leading/Trailing Electrodes | Frequency (Hz) | Shape of Forward End of Trailing Electrode | Results of Welding |
|---|---|---|---|---|---|---|
| A | 300 | 350 | 1/1 | 250 |  | Excessive Melting |
| B | 500 | 350 | 1/1 | 250 |  | Good |
| C | 1000 | 350 | 1/1 | 250 |  | No Melting |
| D | 500 | 300 | 1/1 | 250 | | Poor Melting |
| E | 500 | 350 | 1/1 | 250 | | Good |
| F | 500 | 370 | 1/1 | 250 | | Fairly Good |
| G | 500 | 350 | 1/1 | 50 | | Melting Unstable |
| H | 500 | 350 | 1/1 | 250 | | Good |
| I | 500 | 350 | 1/1 | 500 | | Good |
| J | 500 | 350 | 1/1 | 250 | | Good |
| K | 500 | 350 | 6/4 | 250 | | Fairly Good |
| L | 500 | 350 | 4/6 | 250 | | Fairly Good |
| M | 500 | 350 | 1/1 | 250 | | No Melting |
| N | 500 | 380 | 1/1 | 250 | | Melting Unstable |
| O | 500 | 410 | 1/1 | 250 | | Good |

From Table 2, it will be seen that particularly good results were achieved with specimens B, E, H, I and J.

The welding method according to the invention has particular utility in joining end faces of a plurality of members superposed one over another by spot welding. Moreover, it is capable of achieving good results in joining thin sheets by spot welding while limiting heat input, to avoid excess penetration. In addition, it is capable of achieving good results in welding stainless steel and other dissimilar metal by using a heat input of low order.

From the foregoing description, it will be appreciated that the spot welding carried out by the two electrode TIG welding method according to the invention is capable of producing a sound weld zone which is free from blowholes, because the members to be welded are preheated by the heat of the arc and degassed and degreasing of the surfaces of the members to be welded are effected by the heat of the arc at the same time as the combustion gas produced by the insulating material is made to escape before the members to be welded are joined by welding. Moreover, the use of the two electrodes is conducive to reduce arc pressure and enables excess penetration to be avoided, thereby allowing welding to be carried out stably. The use of a main shield gas and a subsidiary shield gas enables production of blowholes to be positively avoided.

What is claimed is:

1. A two electrode welding method wherein welding is carried out by means of arcs struck between two electrodes and a parent metal, said two electrodes being a leading electrode and a trailing electrode located in side-by-side, spaced-apart relation in a direction in which the welding surface advances and movable relative to the parent metal, said method comprising the steps of:

passing a welding current alternately to the leading and trailing electrodes;

controlling the value of a peak current supplied to the leading electrode to be a value higher than that of a peak current supplied to the trailing electrode;

controlling the value of a time distribution rate of the peak current supplied to the trailing electrode to be a value higher than that of a time distribution rate of the peak current supplied to the leading electrode;

preheating a portion of the parent metal by the heat of the arc struck between the leading electrode and the parent metal; and melting the preheated portion of the parent metal by the heat of the arc struck between the trailing electrode and the parent metal when the former has moved to a position above the preheated portion of the latter.

2. A two electrode welding method as claimed in claim 1, wherein said two electrodes are nonconsumable electrodes.

3. A two electrode welding method as claimed in claim 1 or 2, wherein said parent metal is copper.

4. A two electrode welding method as claimed in claim 1, wherein an arc pressure of the trailing electrode is made lower than that of the leading electrode, and wherein a mean current supplied to the trailing electrode is made below 50% of that supplied the leading electrode.

5. A two electrode welding method as claimed in any one of claims 1 or 2, further comprising the step of supplying a base current to the leading electrode and trailing electrode with respect to the welding current, the base current having a value such that no magnetic interference is produced between the arcs generated between the electrodes and the parent metal.

6. A two electrode welding method wherein welding is carried out by means of arcs struck between two electrodes and a parent metal, said two electrodes being a leading electrode and a trailing electrode located in side-by-side, spaced-apart relation in a direction in which the welding surface advance and movable relative to the parent metal, said method comprising the steps of:

passing a welding current alternately to the leading and trailing electrodes;

controlling the value of a peak current supplied to the leading electrode to be a value higher than that of a peak current supplied to the trailing electrode;

controlling the value of a time distribution rate of a peak current supplied to the trailing electrode to be a value higher than that of a time distribution rate of the peak current supplied to the leading electrode;

preheating a portion of the parent metal by the heat of the arc struck between the leading electrode and the parent metal; and melting the preheated portion of the parent metal in the form of spots by the heat of the arc struck between the trailing electrode and the parent metal when the former has moved to a position abover the preheated portion of the latter.

7. A two electrode welding method as claimed in claim 6, further comprising the step of supplying a base current to the leading electrode and trailing electrode with respect to the welding current, the welding current being in the form of a pulse current, the base current having a value such that no magnetic interference is produced between the arcs generated between the electrodes and the parent metal.

8. A two electrode welding method wherein welding is carried out by means of arcs struck between two electrodes and a parent metal, said two electrodes being a leading electrode and a trailing electrode located in side-by-side, spaced-apart relation in a direction in which the welding surface advances and movable relative to the parent metal, said method comprising the steps of:

passing a welding current alternately to the leading and trailing electrodes;

controlling the value of a peak current supplied to the leading electrode to be a value higher than that of a peak current supplied to the trailing electrode;

controlling the value of a time distribution rate of the peak current supplied to the trailing electrode to be a value higher than that of a time distribution rate of the peak current supplied to the leading electrode;

preheating portions to be welded together of a riser and a coiled conductor in a commutator of a rotary electric machine including commutator bars and mica segments alternately arranged circumferentially by the leading electrode in the welding surface advancing direction; and melting the preheated portions by the trailing electrode moved to a portion above the preheated portions.

9. A two electrode welding method as claimed in claim 8, wherein said commutator bars and said coiled conductors are copper.

10. A two electrode welding method as claimed in claim 8 or 12, wherein the welding is performed as a downhand welding by using nonconsumable electrodes as the leading electrode and the trailing electrode.

11. A two electrode welding method as claimed in claim 8 or 9, wherein said two electrodes are nonconsumable electrodes and the welding is carried out in the form of spots.

12. A two electrode welding method as claimed in claim 11, further comprising the step of supplying a base current to the leading electrode and trailing electrode with respect to the welding current, the base current having a value such that no magnetic interference is produced between the arcs generated between the electrodes and the parent metal.

13. A two electrode welding method as claimed in claim 8, further comprising the step of degassing the mica segments adjacent the portions to be welded prior to performing the step of melting.

14. A two electrode welding system for welding by establishing arcs between the two electrodes and a parent metal, the system comprising a leading electrode and a trailing electrode located in side-by-side, spaced-apart relation in a direction in which the welding surface advances and movable relative to the parent metal, means for alternately supplying a welding current to the leading and trailing electrodes, means for controlling the value of a peak current supplied to the leading electrode to be a value higher than that of a peak current supplied to the trailing electrode, and means for controlling the value of a time distribution rate of the peak current supplied to the trailing electrode to be a value higher than that of a time distribution rate of the peak current supplied to the leading electrode, whereby preheating of the parent metal can be effected by the arc established between the leading electrode and the parent metal and melting of the parent metal can be effected by the arc established between the trailing electrode and the parent metal when the trailing electrode has moved to a position above the preheated portion of the parent metal.

15. A two electrode welding system as claimed in claim 14, further comprising means for supplying a base current to the leading electrode and the trailing electrode with respect to the welding current, means for supplying the base current controlling the value thereof so that no magnetic interference is produced between the arcs established between the electrodes and the parent metal.

* * * * *